United States Patent [19]

Kracl

[11] Patent Number: 4,583,354
[45] Date of Patent: Apr. 22, 1986

[54] CORN HARVESTER COMBINE ASSEMBLY WITH CORN REMOVAL ATTACHMENT

[76] Inventor: Norman P. Kracl, W. Highway 20, Box 9-B, O'Neil, Nebr. 68763

[21] Appl. No.: 692,512

[22] Filed: Jan. 18, 1985

[51] Int. Cl.[4] .................. A01D 45/00; A01D 41/00; A01D 61/00
[52] U.S. Cl. ........................ 56/16.6; 56/2; 56/14.6
[58] Field of Search ............ 56/16.6, 2, 14.5, 14.6

[56] References Cited

U.S. PATENT DOCUMENTS

| 2,680,338 | 6/1957 | Space | 56/16.6 |
|---|---|---|---|
| 2,926,477 | 3/1960 | Bebow | 56/16.6 |
| 3,599,402 | 8/1971 | Heising | 56/2 |
| 3,778,865 | 12/1973 | Schmidt, Jr. | 56/16.6 |
| 4,256,431 | 3/1981 | Strauss et al. | 56/16.6 |
| 4,324,091 | 4/1982 | Wistuba et al. | 56/16.6 |
| 4,332,261 | 6/1982 | Weesger | 56/16.6 |
| 4,414,794 | 11/1983 | Riedinger | 56/16.6 |

FOREIGN PATENT DOCUMENTS 116772 4/1943 Australia .................. 56/16.6

Primary Examiner—Paul J. Hirsch
Attorney, Agent, or Firm—Klaas & Law

[57] ABSTRACT

A corn harvester combine assembly including a self-propelled combine with internal corn processing apparatus, a corn head for removing ear corn from planted corn stalks in a field and a corn removal attachment selectively mountable between the combine and the corn head to cause ear corn to be removed from the corn head and stored in a separate location without being processed by the combine in an ear corn harvesting mode of operation.

16 Claims, 6 Drawing Figures

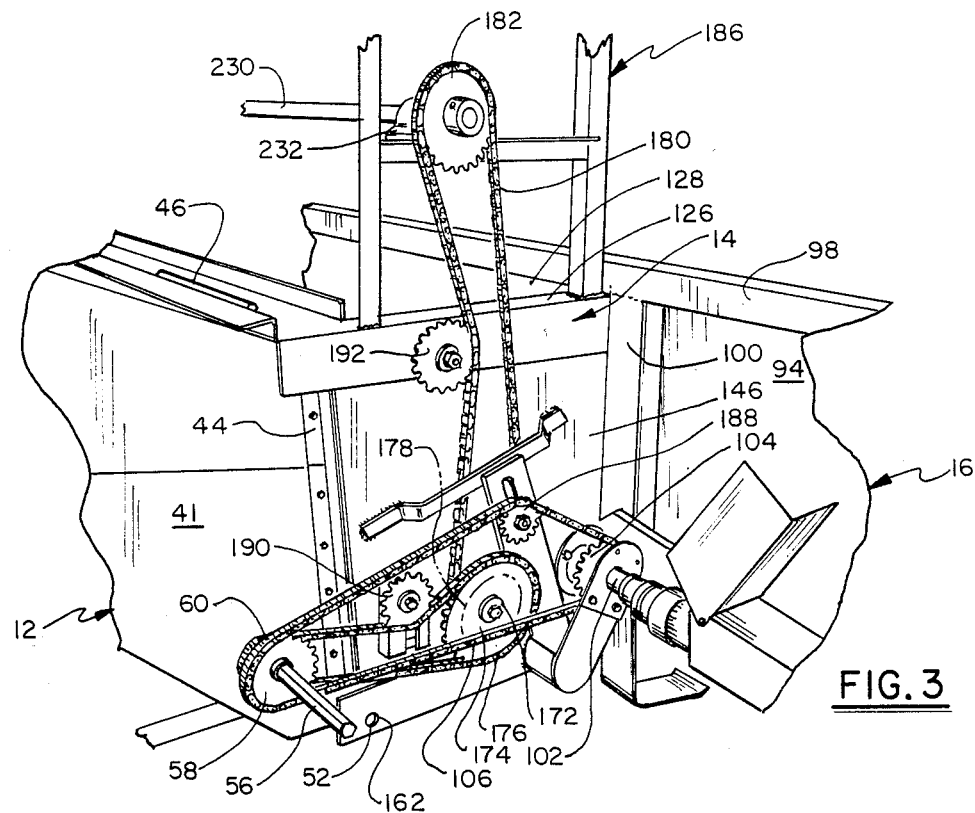
FIG. 3
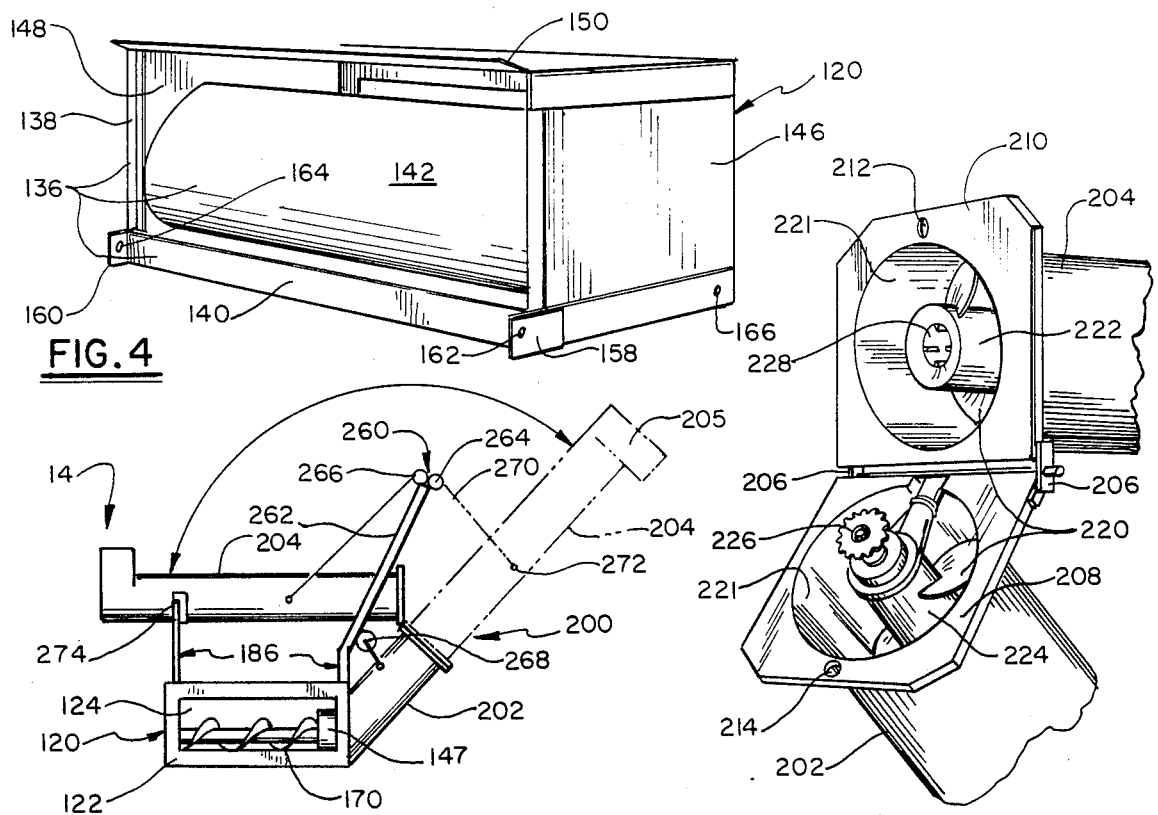
FIG. 4
FIG. 5
FIG. 6

CORN HARVESTER COMBINE ASSEMBLY WITH CORN REMOVAL ATTACHMENT

BACKGROUND OF THE INVENTION

The present invention relates generally to corn harvesting apparatus and, more particularly, to a corn harvester combine assembly including an attachment which may be positioned between a self-propelled combine and a corn head attachment to cause ear corn to be removed from the corn head attachment and off loaded to a wagon or the like to prevent further processing of the ear corn by the combine.

Self-propelled combines have been in widespread use for the past 20 or 30 years for harvesting various crops. Corn harvesting combines are conventionally used with a front end attachment known as a corn head, which comprises a plurality of forwardly projecting gathering members forming a comb-like configuration, having snapping rolls located between the gathering members. The gathering members travel between the rows of corn, causing the corn stalks to pass between the snapping rolls where the ears of corn are pulled from the stalks. The separated ears of corn are thereafter conveyed to a central portion of the corn head, usually by an auger, which causes the ear corn to move through an opening in the rear of the corn head and thereafter through a second opening in a forward portion of the combine. A conveying system in the combine moves the corn through various processing areas within the interior of the harvester. Several operations are performed on the corn as it passed through the harvester, including removal of the corn husks and shelling. The shelled corn may be stored in a storage portion of the combine or may be transferred by a conveying system to a supplementary storage vehicle such as a grain truck or wagon. Corn harvesting combines and corn heads, therefore, are described in Hoeksema U.S. Pat. No. 3,174,266; Ashton et al., U.S. Pat. No. 3,350,863; and Sammann U.S. Pat. No. 4,137,695 which are hereby incorporated by reference.

Processing of the corn in the above described manner allows the shelled corn, which is the most highly concentrated feed component of the plant, to be efficiently stored in grain elevators or the like. However, there are a number of situations in which it is generally desirable to retain the ear corn intact on the cob for subsequent storage in unprocessed form. One situation in which harvesting of corn in ear corn form is desirable is harvesting of sweet corn for subsequent sale to consumers as ear corn. Another situation for harvesting whole ears is harvesting of feed corn that is to be fed to local livestock. Corn fed in whole ear form provides additional nutrients, etc. which are present in the cob and husk.

Numerous apparatus exist for picking ear corn without the additional steps of husking, shelling, etc. Most such units are adapted to be mounted on or towed by a conventional farm tractor. Such tractor mounted corn pickers are described in Kuhlman, U.S. Pat. No. 2,560,801; Adolphsen, U.S. Pat. No. 2,787,877; Solterbeck, U.S. Pat. No. 3,885,375; and Looker, U.S. Pat. No. 3,429,111. However, due to the relatively small size of conventional farm tractors as compared to harvester combines, such units can typically handle only two or three rows of corn at a time and are thus substantially less efficient than a combine which may utilize a large corn head to handle eight or more rows at a time.

Weber, et al., U.S. Pat. No. 3,693,330 and Ashton, U.S. Pat. No. 3,630,009 describe self-propelled sweet corn harvesters which have specially adapted internal assemblies which are used rather than conventional husking and shelling assemblies to cause the corn to be stored in the combine in ear corn form. Such combine assemblies, although suited for picking corn in ear form, are not readily adaptable for processing corn in shelled form. Thus, a farmer utilizing such a combine would be required to invest in a second combine for harvesting corn in shelled form or would be required to spend a considerable amount of time modifying the internal structure of his combine to make it usable in both a shelled corn harvesting mode and an ear corn harvesting mode.

It would be generally desirable to provide a combine assembly which could be readily adapted for use in either a shelled corn harvesting mode or an ear corn harvesting mode.

SUMMARY OF THE INVENTION

The present invention provides a single relatively low cost relatively compact adaptor unit which may be quickly and easily installed on removed from a conventional corn harvester combine and corn head assembly. The adaptor unit causes ear corn to be removed from the corn head and stored in a separate area, thus preventing it from being processed by the combine. Thus, the adaptor enables the farmer to use a single combine for harvesting corn in both shelled and ear corn form.

In one embodiment, the invention comprises a corn harvesting assembly for harvesting ear corn including:

a. detachable corn head means positioned at a forwardmost portion of the combine assembly for removing corn ears from planted corn stalks, said detachable corn head means having a plurality of forwardly extending gathering members positionable between rows of corn to be harvested and having a plurality of power driven snapping means positioned between associated pairs of gathering members for snapping corn ears from corn stalks received between said gathering members, said corn head means having power driven corn head conveying means for conveying the corn ears removed from the corn stalks by said snapping means to a central rearwardly positioned opening in said corn head means for subsequent removal from said corn head means;

b. detachable ear corn removal means attachable to a rear portion of said detachable corn head means for receiving ear corn from said corn head means; said ear corn removal means having a power driven removal conveyor means for conveying ear corn received from said corn head means to a transport vehicle such as a wagon;

c. combine means attachable to a read end portion of said detachable corn head means in a corn processing mode of operation and attachable to a rear end portion of said detachable corn removal means in an ear corn segregating mode of operation for selectively supporting and transporting said corn head means and said corn removal means and for driving said power driven components of said corn head means and said corn removal means, said combine means having a pair of forwardly mounted drive wheels and a pair of rearwardly mounted steering wheels, said combine means having an ear corn processing assembly for removing corn husks from the ear corn, shelling the ear corn, segregating the shelled corn and removing of husks, cobs and debris from said combine means; said ear corn processing assembly having a forwardly positioned opening for receiving ear corn from said corn head means in said corn processing mode of operation, said opening being blocked from receiving ear corn by a rearward portion of said corn removal means in said ear corn removal mode of operations;

d. said combine means having a power drive means for driving said power driven components of said corn head means in said corn processing mode of operation and for driving said power driven components of both said corn head means and said corn removal means in said ear corn removal mode of operation;

e. said combine means having a forward attachment portion attachable to a rear attachment portion of said corn head in said corn processing mode of operation and attachable to a rear attachment portion of said corn removal means in said ear corn removal mode of operation;

f. said detachable ear corn removal means having a forward attachment portion attachable to said rear attachment portion of said corn head in said corn removal mode of operation;

g. said detachable ear corn removal means being an integral unit of relatively compact size.

BRIEF DESCRIPTION OF THE DRAWING

FIG. 3 is a detail view of a portion of the corn harvester assembly of FIGS. 1 and 2.

FIG. 4 is a perspective view of a horizontal housing portion of the ear corn removal attachment shown in FIGS. 1-3, but with drive gears and associated bores and support structure not shown.

FIG. 5 is a schematic front elevation view of the ear corn removal attachment of FIGS. 1-4.

FIG. 6 is a detail perspective view of an inclined auger and associated housing portion of the ear corn removal attachment of FIGS. 1-5.

DETAILED DESCRIPTION OF THE INVENTION

Figure 1:
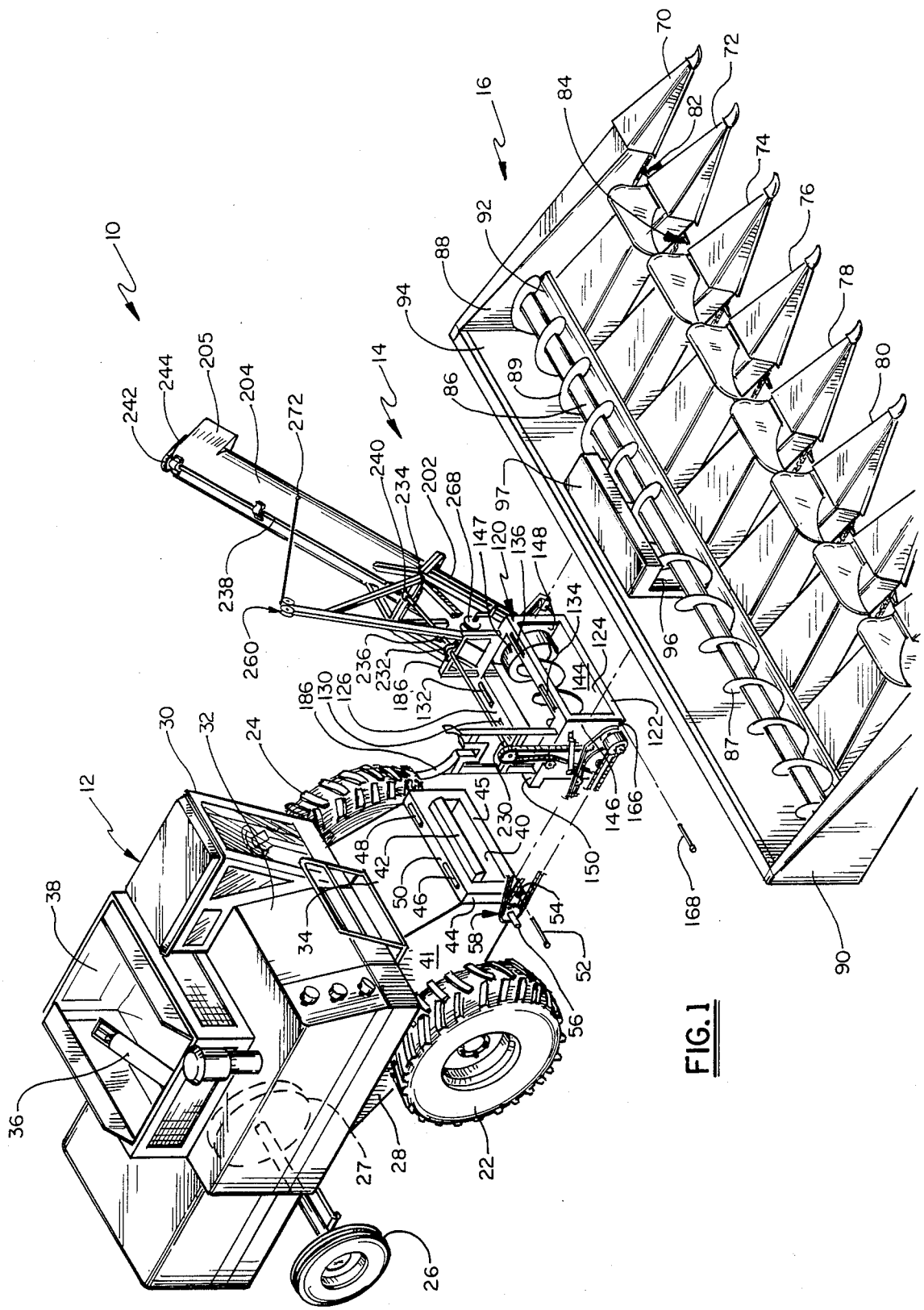
FIG. 1 is a disassembled perspective view of a corn harvester assembly including a corn harvester combine, an ear corn removal attachment, and a corn head attachment.
Figure 2:
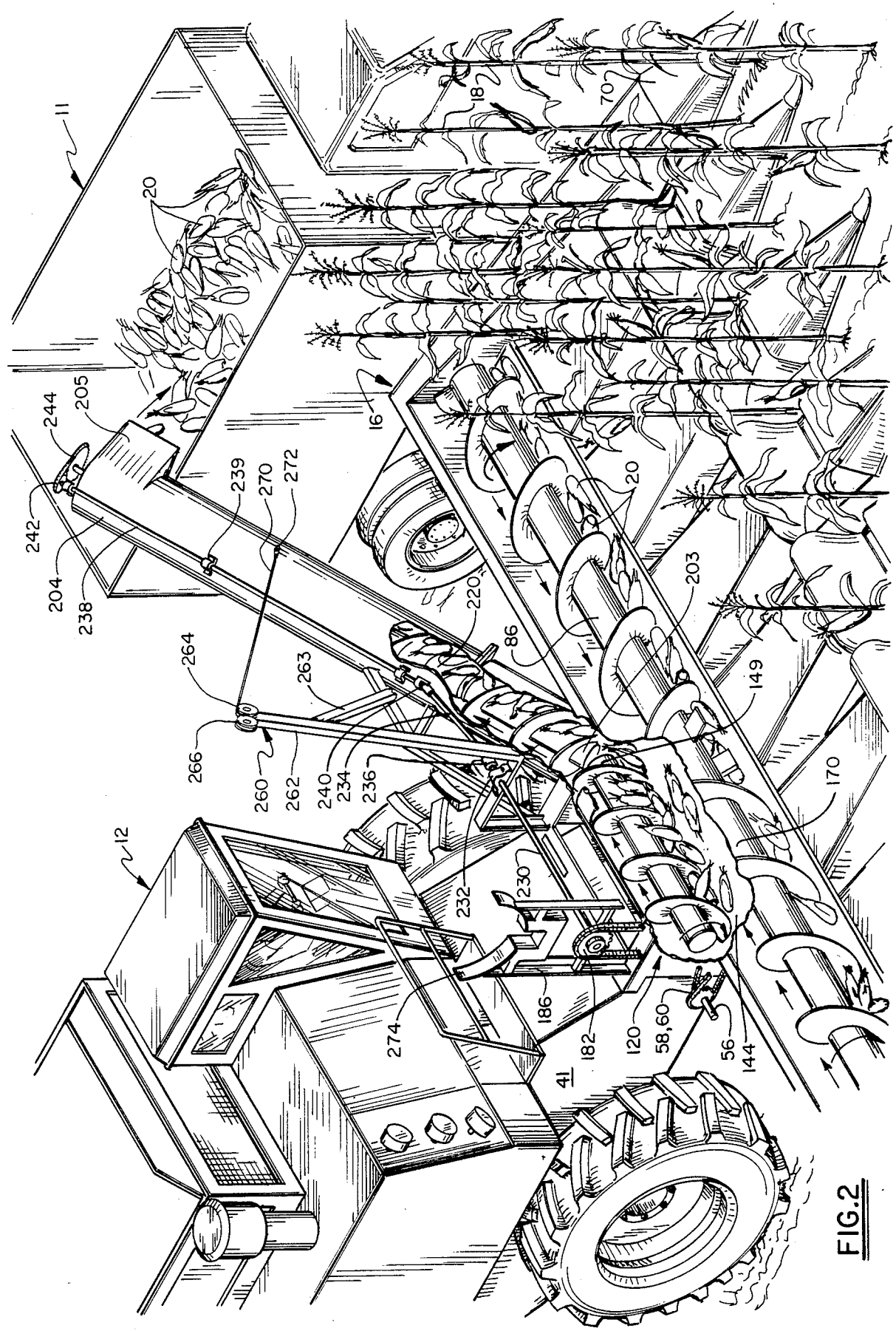
FIG. 2 is a perspective view of the corn harvester assembly of FIG. 1 in assembled, operating form.

As illustrated in FIGS. 1 and 2, the corn harvester assembly 10 of the present invention comprises a combine means such as a conventional corn harvester combine unit 12, a detachable corn head means such as conventional corn head attachment 16, which is conventionally mountable on the corn harvester combine unit in a conventional harvesting mode of operation; and a detachable ear corn removal means such as ear corn removal attachment 14, which is adapted to be mounted between the combine unit 14 and the corn head attachment 16 in an ear corn harvesting mode of operation. Conventionally, ear corn 20 gathered from corn stalks 18 by the corn head attachment 16 would be passed rearwardly through an opening in the corn head attachment to a forward snout portion 41 of an attached corn harvester combine unit 12. After passing into the forward snout 41, the ear corn would be processed to segregate and store the corn kernels (shelled corn) separately from the corn husks and cobs, which would be jettisoned from the combine unit as trash. In the present invention, the ear corn removal attachment 14 is adapted to be attached to a forward portion of the corn harvester assembly snout 41 and a rear portion of the corn head attachment 16. The ear corn removal attachment 14, as shown in FIG. 2, causes ear corn 20 passing rearwardly out of the corn head attachment 16 to be transported laterally into a separate storage area, such as the bed of a truck 11 or the like. Thus, the ear corn removal attachment 14 facilitates the collection and storage of corn in ear corn form when used in a corn harvester assembly including a combine unit 12 and corn head attachment 16, which is conventionally used to harvest corn in shelled form. The ear corn removal attachment 14 is provided in a single integral unit which is readily attachable and detachable to the combine unit 12 and corn head attachment 16. The corn head attachment 16 and ear corn removal attachment 14 are both powered by the power take off 56 of the combine unit 12. Having thus described the invention in general, the various components of the corn harvester assembly 10 will now be described in further detail.

Combine Means

The combine means of the present invention, as best shown in FIG. 1, may comprise a conventional corn harvester combine unit 12 having a pair of forwardly mounted drive wheels 22, 24 and a pair of rearwardly mounted steering wheels 26, 27 mounted on a longitudinally extending frame 28. A cab 30 having conventional controls and steering apparatus for use by an operator, is mounted on a forward left-hand portion of the frame 28. A drive unit 32 may be positioned centrally adjacent cab 30 and provides the power to drive the drive wheels 22, 24 and to operate various crop processing assemblies within the combine crop processing unit 34. The crop processing unit may extend from a forward snout portion 41 of the combine rearwardly through the interior of the combine, terminating in an internal auger 36 which deposits the processed corn into an internal combine storage bin 38. The forward snout 41 of the combine comprises a crop receiving opening 40 which conventionally receives crops such as ear corn from a rear portion of the corn head attachment 16, described in further detail below. The forward snout 41 comprises means for attaching a corn head or other attachments to the combine, such as forwardly projecting lip 42 mounted above opening 40 and rectangularly shaped rim 44 having a forward vertical planar surface 45 adapted to abut with a planar surface of a corn head or other attachment. Other portions of the attachment means may comprise upwardly extending ribs 46, 48 adapted to receive slots or socket portions (not shown) in the corn head 16. The ribs 46, 48 may be mounted on an upper horizontal surface of rim 44. The front end attachment means may also include quick connect and release means such as pins 52 (only one shown) and pin holes 54 (only one shown).

A power take off shaft 56 receiving power from the drive unit 32, is provided to power various combine attachments such as corn head 16. The power take off shaft may be provided with one or more gears, such as gears 58, 60.

Detachable Corn Head Means

The detachable corn head means of the corn harvester assembly 10 may comprise a conventional corn head attachment 16 having a plurality of forwardly projecting gathering members 70, 72, 74, 76, 80, etc. assembled in a comb-like configuration. Adjacent pairs of gathering members have conventional snapping assemblies 82, 84, etc. positioned therebetween to snap corn ears from corn stalks passing between the gathering members. A horizontal auger 86 is positioned rearwardly of the gathering members and may comprise a first screw portion 87 and a second screw portion 89 having reverse pitches. The horizontal auger 86 is journaled between lateral side walls 88, 90 of the corn head. The lateral side walls are fixedly attached to a horizontal bottom wall 92 mounted directly beneath the horizontal auger 86. A vertical rear wall 94 is fixedly attached to the lateral side walls 88, 90 and horizontal bottom wall 92 and is positioned in close proximity to the horizontal auger 86 such that all ear corn transported to the horizontal auger 86 is moved laterally inwardly and thence rearwardly through a centrally positioned opening 96 in the vertical rear wall 94. A forwardly projecting plate member 97 forms an enclosure above the opening 96 to facilitate rearward movement of the ear corn through the opening 96. As illustrated in FIG. 3, the vertical rear wall 94 may be provided with structural support by an upper horizontal beam 98 and a pair of vertical beams 100 (only one shown) which form a rectangular configuration which facilitate mounting of the corn hear attachment on the forward snout 41 of the combine and alternately on attachment 14. Horizontal beam 98 may comprise slotted portions therein (not shown) adapted to accept rib portions 46, 48 of the combine snout portion and alternately rib portions 130, 132 of attachment 14 as described below. The rearward vertically disposed planar surface of corn head rear wall 94 positioned around opening 96 is adapted to be positioned in abutting relationship with the combine snout forward vertical planar surface 45 and alternately planar surface 122, of FIG. 5, of attachment 14. Pin bores (not shown) may be provided in the vertical beams 100, which are alignable with pin holes 54, etc. in the combine snout to facilitate attachment of the corn head to the forward snout as by pins 52, etc., or alternately to the ear corn removal attachment as by pins 16S, etc. Thus, the portions of the corn head 16 adapted to be connected to the combine snout 41 may also be used to attach the corn head to the ear corn removal attachment 14. A corn head drive shaft 102 is provided behind the rear wall 94 of the corn head and is operably connected by conventional linkage means to the corn head auger 86 and snapping units. A drive shaft gear 104 is adapted to receive a corn head drive chain 106 which may be drivingly connected to combine power take off drive gear 58 to drive the corn head horizontal auger and snapping units, FIG. 3.

Ear Corn Removal Means

As illustrated in FIGS. 1-5, the detachable ear corn removal means of the present invention may comprise an ear corn removal attachment 14 having a generally parallelepiped shaped (rectangular box shaped) housing 120. The housing includes a front wall 122 having a front wall rectangular opening 124 of substantially the same size as the rear opening 96 in corn head 16. The housing 120 also comprises a top wall 126 which may have a top wall rectangular opening 128, FIG. 3. The top wall may also comprise a rearwardly extending flange 150, FIGS. 1 and 4, containing a pair of transversely extending slots 130, 132 and adapted to accept ribs 46, 48 provided on the combine snout 41. The top wall may also comprise upwardly and transversely extending ribs 134, 136 at a forward portion thereof which are adapted to be received within slot portions (not shown) of the corn head 16. The corn head slot portions are also adapted to receive the combine snout ribs 46, 48 when the corn head is used without attachment 14. As best illustrated in FIG. 4, the housing 120 comprises a rear wall 136 having vertical, planar peripheral surfaces 138, 140, etc. adapted to abut against the combine forward vertical face surface 45. The rear wall also comprises a rear auger shield plate 142 having a radius of curviture adapted to enclose a rear portion of the horizontal auger 170, described in further detail hereinafter. The housing 120 also comprises a planar horizontally disposed bottom wall 144 and a pair of planar end walls 146, 148, FIG. 1. One of the end walls 148 comprises a circular opening 149 therein, FIG. 2, adapted to allow passage of horizontal auger 170 therethrough. An auger end shield 147 extends laterally inwardly from the opening 149 in end wall 148 to facilitate movement of ear corn through the opening 149. A pair of lower rearwardly extending vertical plate members 158, 160 are fixedly attached to the end walls 146, 148 and may comprise a pair of pin holes 162, 164 therein. The pin holes 162, 164 are adapted to be aligned with pin holes 54, etc. in the combine snout 41 such that removable connecting pins 52, etc. FIG. 1, may be inserted therethrough to attach the ear corn removal attachment 14 to the combine 12. A pair of forward pin holes 166 (only one shown) may be provided to receive a pair of forward pins 168 (only one shown) to attach a forward portion of the ear corn removal attachment 14 to the corn head 16 at oppositely positioned holes (not shown) in vertical members 100, etc. The forward end portion of the ear corn removal attachment 14 is of a size and shape which is adapted to be received between vertical members 100, etc. of the corn head 16 in close relationship therewith.

A horizontal auger 170, FIGS. 2 and 5, is mounted in the housing 120 and extends transversely of the direction of movement of the combine assembly 10. The horizontal auger 170 comprises a drive shaft 172 extending through and journalled to housing wall 146 and having a drive gear 174 fixedly attached at one end thereof, FIG. 3. The drive gear 174 is operatively attached to a drive chain 176 which is, in turn, attached to the combine power take off drive gear 60 as best shown in FIG. 3. A first drive gear 178 for inclined auger 220 is also mounted on horizontal auger drive shaft 172 and is drivingly linked by chain 180 to a second drive gear 182 for inclined auger 220, as described in further detail hereinafter. The second drive gear 182 is mounted on an inclined auger first drive shaft 230 which is, in turn, journalled to an upper frame and cradle structure 186 mounted on the top wall of housing unit 120. Adjustable chain tighteners 188, 190, 192 are provided to tighten drive chains 106, 176, 180. The chain tightening gears may be conventionally mounted in slots suitably provided in attachment plates, etc. mounted on the end wall 146.

An inclined auger housing 200 comprises a lower portion 202 fixedly attached to horizontal auger housing end wall 148 and an upper portion 204 terminating in a chute 205. The upper housing portion 204 is attached to the lower housing portion 202 by a conventional pivotal attachment 206, FIG. 6. The lower portion 202 terminates in a lower opening 203, FIG. 2, placing it in communication with housing 120 through side wall opening 149. The lower portion 202 and upper portion 204 may have a lower plate 208 and upper plate 210 fixedly attached thereto, respectively. The surfaces of the upper and lower plate abut when the upper and lower portions of the housing are positioned in alignment. Attachment bores 212, 214 may be provided in the plates to facilitate holding the two plate surfaces in abutting contact as by a bolt or other attachment means (not shown). An inclined auger 220 is received within a central bore portion 221 of the auger housing. The inclined auger 220 comprises an upper portion 222 and a lower portion 224. An auger male coupling gear 226 is mounted at the upper terminal end of lower auger portion 224 and a female gear socket 228 is provided at the lower terminal end portion of the auger upper portion 222. The female gear socket 228 and the male gear 226 are constructed and arranged such that when the inclined auger housing lower portion 202 and upper portion 204 are placed in alignment, the gears 226 and 228 mesh and transmit power from the upper auger portion 222 to the lower auger portion 224. However, there is also sufficient clearance in the gear connection to allow the upper auger housing 204 to be pivoted away from the lower auger housing 202 without binding of the gears 226, 228. Referring to FIGS. 1-3, it may be seen that the inclined auger first drive shaft 230 is mounted on upper frame and cradle structure 186 in suitable journals 232 and is drivingly connected to a second drive shaft 234 by a first universal coupling 236. A third drive shaft 238 conventionally journalled to inclined auger housing upper portion 204, as by journals 239, etc., is connected to the second drive shaft by a second universal coupling 240. A drive shaft end gear 242 provided at the end of drive shaft 238 is drivingly connected to upper auger portion end gear 244. Thus, power is transmitted through the combine power take off shaft 56 through the various chains, gears and drive shafts to the inclined auger 220. It may be seen that the second universal coupling 240 is provided in the same plane as plates 208, 210 such that pivotal movement of the upper housing portion 204, with respect to the lower housing portion 202, is accommodated by the coupling 240.

An auger hoist assembly 260, FIGS. 2 and 5, having a fixed boom 262 suitably supported by structural support members 263, may comprise a pair of pulleys 264, 266 rotatably mounted at an end portion thereof and adapted to receive a cable 270 in a first orientation when the upper auger portion 204 is in a functioning position and a second orientation when the housing portion 204 is in a folded position as illustrated in FIG. 5. The cable 270 is conventionally wrapped about a hand winch 268 at one end, and is fixedly attached to an upper auger housing connecting eyelet 272 at the other end. The hoist assembly 260 is constructed and arranged such that the upper housing portion 204 may be raised to a nearly vertical orientation from either an operating orientation, as illustrated in phantom in FIG. 5, or from a folded position, as illustrated in solid lines in FIG. 5. Thereafter, a small push by hand is sufficient to move the auger housing 204 from a vertical orientation to a slightly inclined orientation in the direction to which the housing 204 is to be moved. Thereafter the winch is again used to lower the housing to its new orientation. A semi-circular inclined auger cradle member 274 is positioned atop the upper frame and cradle structure 186 at an elevation such that the upper housing portion 204 is positioned in a substantially horizontal orientation when in the folded position illustrated in FIG. 5.

Operation

The operation of the corn harvester assembly 10 will now be described with reference to FIGS. 1 and 2. In one mode of operation, the corn harvester combine unit 12 and the corn head attachment 16 are used in a conventional manner without the ear corn removal attachment 14. In this mode of operation, the corn head attachment 16 is mounted on the snout portion 41 of the corn harvester combine unit 12 with the ribs 46, 48 being received in slotted or indented portions (not shown) in the corn head attachment 16. Power for operating the corn head attachment 16 is provided by the combine power take off 56 through conventional chain drive linkage. The corn head moves through rows of corn receiving corn stalks 18 between associated pairs, e.g. 70, 72 of gathering members. Ear corn 20 is pulled from the corn stalks 18 and is conveyed by the corn head horizontal auger 86 through corn head rear opening 96 and thence into the forward opening 40 of the combine 12. Thereafter the ear corn is processed by the combine crop processing unit 34 causing husks to be removed from the corn and thereafter, causing the corn to be shelled and stored in the combine internal storage bin 38. Such a combine and corn head assembly and use is conventional and well known in the art.

In a second ear corn harvesting mode of operation, a corn harvester assembly comprising the corn harvester combine unit 12, the ear corn removal attachment 14 and the corn head attachment 16 is used. In this mode of operation, the ear corn removal attachment 14 is mounted on the forward snout 41 of the combine utilizing the same portion of the combine that was originally used to mount the corn head 16. Upper ribs 46, 48 of the combine are received within transversely extending slots 130, 132 of the ear removal attachment 14. Pins 52 may also be positioned in bores 54, 162, etc. to secure the ear corn removal attachment 14 to the combine 12. The corn head attachment 16 is mounted at the forward end of the ear corn removal attachment 14 utilizing the same portions thereof that were used to attach it to the combine. For example, the slotted portions (not shown) in the corn head may receive upwardly projecting ribs 134, 136 and pins 168 may be placed in associated bores 166, etc. The combine power take off 56 is drivingly connected to the drive units of the corn head 16 and ear corn removal attachment 14 in the manner described above with reference to FIG. 3. In this assembly 10, ear corn passing into the corn head 16 rather than moving into the interior of the combine 12, is transported transversely by ear corn removal attachment horizontal auger 170 to a position adjacent inclined auger 220. Thereafter inclined auger 220 causes the corn to be moved upwardly through inclined auger housing 200 and thereafter, out chute 205 into a suitable receiving unit such as a wagon or the bed of a truck 11.

When it is desired to again use the combine in a shelled corn harvesting mode, initially the belt tighteners 188, 190, 192 are loosened and thereafter, the chains 106, 176, 180 are removed. The attachment 14 may thereafter be easily removed by removal of pins 52, 168, etc. and by raising the corn head 16 slightly to cause disengagement of ribs 134, 136. Thereafter the corn head is moved forwardly or the combine is moved rearwardly to completely disengage it from the ear corn removal attachment 14. Corn head removal may be facilitated use of a hoist, jacks, front end loader, etc. for raising the corn head. Thereafter, the ear corn removal attachment, after removal of pins 52, etc., may be raised slightly to cause it to be disengaged from ribs 46, 48. Thereafter, the attachment 14 may be moved forwardly or the corn combine moved rearwardly, slightly, to cause complete disengagement from the combine.

The ear corn removal attachment 14 may be stored in a relatively small area by folding inclined auger housing portion 204 onto the auger cradle 274 through use of hand winch 268. In this configuration, the ear corn removal attachment 14 is also well balanced for transportation to a storage shed or the like, such as by a front end loader mounted on a conventional farm tractor. Thus, it may be seen that the ear corn removal attachment 14 is easily stored and movable by conventional farm equipment and may be quickly and easily installed to convert a conventional corn harvester combine from use in a conventional corn shelling harvesting operation to use in an ear corn harvesting operation.

It is contemplated that the inventive concepts herein described may be variously otherwise embodied and it is intended that the appended claims be construed to include alternative embodiments of the invention except insofar as limited by the prior art.

What is claimed is:

1. A corn harvesting combine assembly for harvesting ear corn comprising:
   (a) detachable corn head means positioned at a forwardmost portion of the combine assembly for removing corn ears from planted corn stalks, said detachable corn head means having a plurality of forwardly extending gathering members positionable between rows of corn to be harvested and having a plurality of power driven snapping means positioned between associated pairs of gathering members for snapping corn ears from corn stalks received between said gathering members, said corn head means having power driven corn head conveying means for conveying the corn ears removed from the corn stalks by said snapping means to a central rearwardly positioned opening in said corn head means for subsequent removal from said corn head means;
   (b) detachable ear corn removal means attachable to a rear portion of said detachable corn head means for receiving ear corn from said corn head means; said ear corn removal means having a power driven removal conveyor means for conveying ear corn received from said corn head means to a transport vehicle such as a wagon;
   (c) combine means attachable to a rear end portion of said detachable corn head means in a corn processing mode of operation and attachable to a rear end portion of said detachable corn removal means in an ear corn removal mode of operation for selectively supporting and transporting said corn head means and said corn removal means and for driving said power driven components of said corn head means and said corn removal means, said combine means having a pair of forwardly mounted drive wheels and a pair of rearwardly mounted steering wheels, said combine means having an ear corn processing assembly for removing corn husks from the ear corn, shelling the ear corn, segregating the shelled corn and removing of husks, cobs and debris from said combine means; said ear corn processing assembly having a forwardly positioned opening for receiving ear corn from said corn head means in said corn processing mode of operation and said opening being blocked from receiving ear corn by a rearward portion of said corn removal means in said ear corn removal mode of operations;
   (d) said combine means having a power drive means for driving said power driven components of said corn head means in said corn processing mode of operation and for driving said power driven components of both said corn head means and said corn removal means in said ear corn removal mode of operation;
   (e) said combine means having a forward attachment portion attachable to a rear attachment portion of said corn head in said corn processing mode of operation and attachable to a rear attachment portion of said corn removal means in said ear corn removal mode of operation;
   (f) said detachable ear corn removal means having a forward attachment portion attachable to said rear attachment portion of said corn head in said ear corn removal mode of operation;
   (g) said detachable ear corn removal means being an integral unit of relatively compact size.

2. The invention of claim 1 wherein said power driven removal conveyor means of said detachable ear corn removal means comprises a horizontal conveyor for receiving ear corn from said detachable corn head means at a centrally located position and for transporting said ear corn laterally relative the direction of movement of said corn harvesting combine assembly.

3. The invention of claim 2 said removal conveyor means further comprising an inclined conveyor for receiving ear corn from said horizontal conveyor and for transporting said ear corn laterally and upwardly to said transport vehicle.

4. The invention of claim 3 wherein said horizontal conveyor comprises a horizontal auger.

5. The invention of claim 3 wherein said inclined conveyor comprises an inclined auger.

6. The invention of claim 5 wherein said inclined auger comprises an upper portion and a lower portion drivingly connectable by a male gear portion and a female gear portion, said inclined auger being mounted in an upper and lower housing portion said upper and lower housing portions being pivotally connected whereby said upper housing portion and said upper auger portion are selectively foldable into a horizontal orientation for transportation and storage of said detachable corn removal means.

7. The invention of claim 6 further comprising a winch assembly operably connected to said upper portion of said inclined auger housing for facilitating pivotal movement of said housing upper portion between said horizontal transport and storage orientation and an operating in alignment with said housing lower portion.

8. The invention of claim 3 wherein said horizontal conveyor and said inclined conveyor comprise separate drive linkages connected to said combine power drive means.

9. An adaptor attachment for a corn harvesting combine assembly for harvesting ear corn of the type including a detachable corn head positioned at a forwardmost portion of the combine assembly for removing corn ears from planted corn stalks, said detachable corn head having a plurality of forwardly extending gathering members positionable between rows of corn to be harvester and having a plurality of power driven snapping means positioned between associated pairs of gathering members for snapping corn ears from corn stalks received between said gathering members, said corn head having power driven corn head conveying means for conveying the corn ears removed from the corn stalks by said snapping means to a central rearwardly positioned opening in said corn head for subsequent removal from said corn head and a combine attachable to a rear end portion of said detachable corn head in a corn processing mode of operation, said combine having a pair of forwardly mounted drive wheels and a pair of rearwardly mounted steering wheels, said combine means having an ear corn processing assembly for removing corn husks from the ear corn, shelling the ear corn, segregating the shelled corn and removing of husks, cobs and debris from said combine means; said ear corn processing assembly having a forwardly positioned opening for receiving ear corn from said corn head means in said corn processing mode of operation; said combine having a power drive means for driving said power driven components of said corn head means in said corn processing mode of operation; said combine having a forward attachment portion attachable to a rear attachment portion of said corn head in a corn processing mode of operation; said adaptor attachment comprising:

detachable ear corn removal means attachable to a rear portion of said detachable corn head and a forward portion of said combine for receiving ear corn from said corn head; said ear corn removal means having a power driven removal conveyor means drivingly connectable to said combine power drive means for conveying ear corn received from said corn head means to a separate transport vehicle such as a wagon.

10. The invention of claim 9 wherein said power driven removal conveyor means of said detachable ear corn removal means comprises a horizontal conveyor for receiving ear corn from said detachable corn head means at a centrally located position and for transporting said ear corn laterally relative the direction of movement of said corn harvesting combine assembly.

11. The invention of claim 10 said removal conveyor means further comprising an inclined conveyor for receiving ear corn from said horizontal conveyor and for transporting said ear corn laterally and upwardly to said transport vehicle.

12. The invention of claim 11 wherein said horizontal conveyor comprises a horizontal auger.

13. The invention of claim 11 wherein said inclined conveyor comprises an inclined auger.

14. The invention of claim 13 wherein said inclined auger comprises an upper portion and a lower portion drivingly connectable by a male gear portion and a female gear portion, said inclined auger being mounted in an upper and lower housing portion said upper and lower housing portions being pivotally connected whereby said upper auger portion are selectively foldable into a horizontal orientation for transportation and storage of said detachable corn removal means.

15. The invention of claim 14 further comprising a winch assembly operably connected to said upper portion of said inclined auger housing for facilitating pivotal movement of said housing upper portion between said horizontal transport and storage orientation and an operating orientation in alignment with said housing lower portion.

16. The invention of claim 11 wherein said horizontal conveyor and said inclined conveyor comprise separate drive linkages connected to said combine power drive means.

* * * * *